United States Patent
Maki et al.

(10) Patent No.: US 8,115,821 B2
(45) Date of Patent: Feb. 14, 2012

(54) METHOD AND APPARATUS FOR SETTING A REGION OF INTEREST IN IMAGE DATA

(75) Inventors: Takashi Maki, Kanagawa (JP); Keiichi Ikebe, Kanagawa (JP); Hiroyuki Sakuyama, Tokyo (JP); Taku Kodama, Kanagawa (JP); Ikuko Yamashiro, Kanagawa (JP); Takanori Yano, Kanagawa (JP); Akira Takahashi, Kanagawa (JP); Takao Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 249 days.

(21) Appl. No.: 12/351,768

(22) Filed: Jan. 9, 2009

(65) Prior Publication Data

US 2009/0122164 A1 May 14, 2009

Related U.S. Application Data

(62) Division of application No. 10/637,420, filed on Aug. 8, 2003, now abandoned.

(30) Foreign Application Priority Data

Aug. 9, 2002 (JP) ................. 2002-232475

(51) Int. Cl.
*H04N 5/235* (2006.01)
*H04N 5/228* (2006.01)
*H04N 5/262* (2006.01)
*H04N 7/18* (2006.01)
(52) U.S. Cl. ................. 348/222.1; 348/161; 348/240.99
(58) Field of Classification Search ............... 348/161, 348/222.1, 240.99, 349, 350, 352, 353, 354, 348/355, 356
See application file for complete search history.

(56) References Cited

U.S. PATENT DOCUMENTS

| | | | | |
|---|---|---|---|---|
| 5,889,582 A | * | 3/1999 | Wong et al. | 356/4.01 |
| 6,490,319 B1 | * | 12/2002 | Yang | 375/240.03 |
| 6,954,233 B1 | * | 10/2005 | Ito | 348/350 |
| 2004/0004670 A1 | * | 1/2004 | Yamashita | 348/345 |
| 2004/0032526 A1 | | 2/2004 | Silverbrook | 348/371 |

FOREIGN PATENT DOCUMENTS

JP 2000-358183 12/2000

(Continued)

OTHER PUBLICATIONS

Japanese Office Action for JP Appln No. JP 2002-232475, Issue Date Feb. 21, 2007 (2 pages).

*Primary Examiner* — Nicholas Giles
(74) *Attorney, Agent, or Firm* — Blakely, Sokoloff, Taylor & Zafman LLP

(57) ABSTRACT

An ROI setting apparatus including an ROI recognition unit and an ROI control unit is provided. In one embodiment, the ROI recognition unit contains multiple ROI recognition modules for recognizing an ROI of image data according to various methods to obtain a recognition result. The ROI control unit selects one ROI recognition module out of the ROI recognition modules and sets ROI information based on the recognition result. The ROI recognition module may be selected according to an instruction from a user input via an operation unit, or a scene type selected by a scene selection switch of an image capture unit. The ROI control unit may perform operations such as selecting, enlarging, or reducing the ROI recognized by the ROI recognition module, or changing the ROI recognition conditions according to the respective instructions from the user input via the operation unit.

6 Claims, 14 Drawing Sheets

FOREIGN PATENT DOCUMENTS

| | | |
|---|---|---|
| JP | 2001-119696 | 4/2001 |
| JP | 11294343 | 4/2001 |
| JP | 2001-145101 | 5/2001 |
| JP | 2000041694 | 8/2001 |
| JP | 2002-176650 | 6/2002 |
| JP | 2002-199401 | 7/2002 |

\* cited by examiner

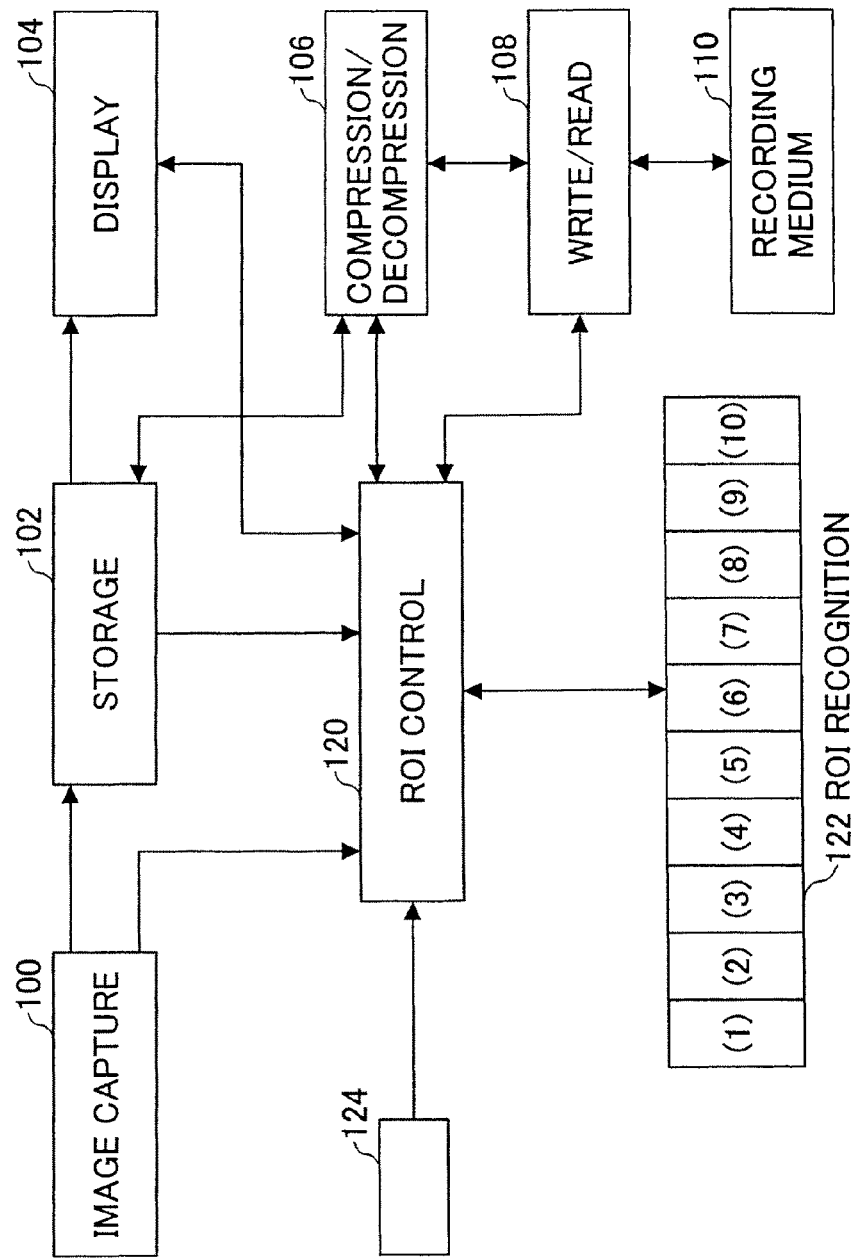

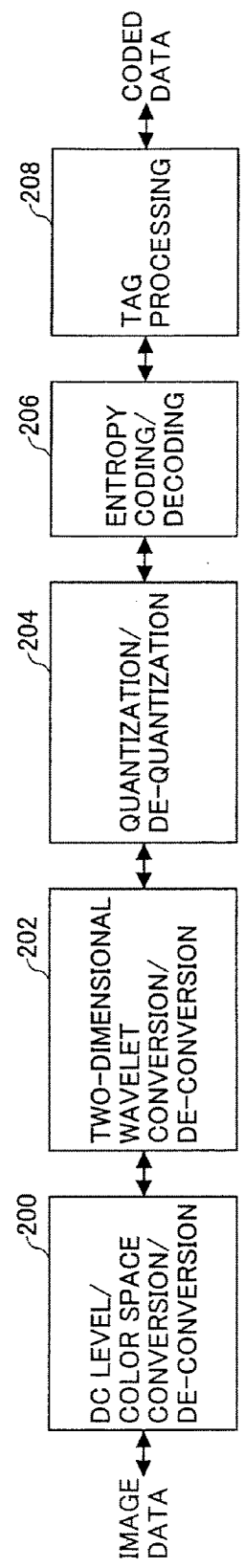

LEVEL 0

LEVEL 1

LEVEL 2

LEVEL 3

METHOD AND APPARATUS FOR SETTING A REGION OF INTEREST IN IMAGE DATA

This is a divisional of application Ser. No. 10/637,420, filed on Aug. 8, 2003 now abandoned, entitled "ROI Setting Method and Apparatus, Electronic Camera Apparatus, Program, and Recording Medium," assigned to the corporate assignee of the present invention and incorporated herein by reference.

The present application claims priority to the corresponding Japanese Application No. 2002-232475 filed on Aug. 9, 2002, the entire contents of which are hereby incorporated by reference.

BACKGROUND OF THE INVENTION

1. Field of the Invention

The present invention relates generally to the field of image processing, and particularly to a technique for setting a region of interest (RO) of an image in an electronic processing apparatus such as an electronic camera.

2. Description of the Related Art

In an electronic apparatus such as a digital camera, a captured image is usually compressed before it is recorded on a recording medium.

Presently, JPEG is widely used for compressing image data; however, a significant amount of research is being done to promote the use of a new image compression technique, JPEG 2000 (ISO/IEC FCD 15444-1). JPEG 2000 has a selective region image quality improvement function (ROI function) for reducing the compression rate (improving the image quality) of a region of interest (ROI) of an image without reducing the compression rate of the overall image.

This ROI function is particularly appealing to an electronic camera. By setting an important region of a captured image as the ROI, high image quality can be maintained in the important region while the amount of data of the overall image other than the important region can be significantly reduced.

To use the ROI function, it is necessary to specify an ROI in each individual captured image. A publicly known technique for specifying the ROI is disclosed in Japanese Patent Laid-Open Publication No. 2001-230947, for example. In this Japanese application, an electronic camera having an EVF (electronic view finder) screen that displays a guidance frame or a template image is disclosed. The guidance frame or template image is used as a base image for framing and capturing an image. Then, a region within the guidance frame or a region other than the template image is handled as the ROI in the compression process of the captured image. Also, the ROI information is recorded on a header of a corresponding image file, and thus the ROI can be displayed on the rest of the reproduced image in the image reproduction process.

Also, Japanese Patent Laid-Open Publication No. 2001-119625 discloses a digital camera that determines a range of a main object of a captured image based on a user operation, handles this range as an ROI, compresses the corresponding range at a lower compression rate than that for the rest of the regions, and describes the ROI information on a header of a corresponding compressed image file. This Japanese patent application mentions that the range of the main object may be determined automatically based on edge or histogram information of the image. However, there appears to be no mention of JPEG 2000 in this Japanese patent application.

The ROI setting method using a guidance frame or a template image as disclosed in Japanese Patent Laid-Open Publication No. 2001-230947 limits the flexibility of the framing and scene capturing operation.

Also, with the method of manually setting the range of the main object as the ROI as disclosed in Japanese Patent Laid-Open Publication No. 2001-119625, there is a problem in that the manual operation can be quite troublesome and the method may not be used for successive capturing of still images or capturing of moving images. Although mention is made of automatically determining the range of the main object based on the edge or histogram of the image, a specific method for determining the ROI does not appear to be disclosed in this Japanese patent application. The legitimacy of the determined ROI depends upon such factor as this determination method.

Also, generally speaking, a wide variety of scene capturing operations need to be considered in automating the ROI setting operation. Further, since user preferences may vary considerably, it may be more practical to enable a user to intervene in the capturing operation to a certain degree.

SUMMARY OF THE INVENTION

An ROI setting technique is disclosed. In one embodiment, an ROI setting apparatus comprises ROI recognition modules each for recognizing an ROI of image data according to a predetermined method and to obtain a recognition result, and an ROI control unit adapted to select an ROI recognition module out of the plurality of ROI recognition modules and set ROI information based on the recognition result obtained by the selected ROI recognition module.

BRIEF DESCRIPTION OF THE DRAWINGS

FIG. 1 is a schematic block diagram illustrating an embodiment of the present invention;

FIG. 2 is a schematic block diagram illustrating JPEG 2000 image compression/decompression algorithms;

DESCRIPTION OF THE PREFERRED EMBODIMENTS

Figure 3A:
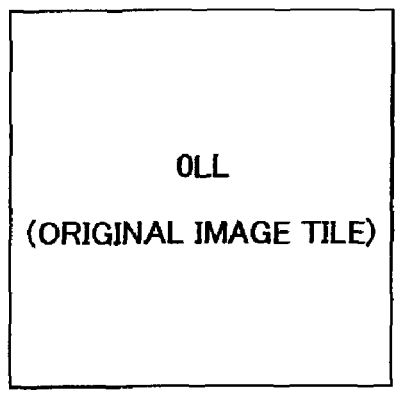
FIGS. 3A-3D are diagrams illustrating two-dimensional wavelet conversion processes.

An ROI setting apparatus and method that can include a more practical ROI setting function in an image processing apparatus such as an electronic camera apparatus are described. One embodiment of the present invention provides an electronic camera apparatus such as a digital camera with a more practical ROI setting function.

In one embodiment of the present invention, an ROI setting apparatus includes: multiple ROI recognition modules each adapted for recognizing an ROI of image data according to a predetermined method and thereby obtaining a recognition result; and an ROI control unit adapted to select an ROI recognition module out of the ROI recognition modules and set ROI information based on the recognition result obtained by the selected ROI recognition modules. The term "module," for purposes herein, may comprise hardware (e.g., circuitry, dedicated logic, etc.), software (such as is run on a general purpose computer system or a dedicated machine), or a combination of both. The terms "module" and "unit" may be used interchangeably.

Since multiple different ROI recognition modules corresponding to ROI recognition methods can be used, a suitable ROI setting operation can be performed for various image data of various captured scenes. Notably, the ROI setting apparatus may be used in a successive capturing of still images or a capturing of moving images.

Further, in one embodiment, the ROI control unit may select the ROI recognition module according to an instruction from a user. The user is able to change the ROI recognition method as desired so that a desired ROI setting operation may be performed.

In an embodiment of the present invention, the ROI control unit may select the ROI recognition module according to a scene type selected by a user. The user can select a scene type and the ROI can be set according to a higher quality ROI recognition method for this scene type.

Further, in an embodiment of the present invention, the ROI control unit may set the ROI information based on a region selected out of a plurality of regions recognized by the selected ROI recognition module, the region being selected, for example, according to an instruction from a user. The user is able to make corrections on the automatically recognized ROI to set an ROI suiting the preference of the user.

Additionally, in an embodiment of the present invention, the ROI control unit may enlarge or reduce a region recognized by the selected ROI recognition module according to an instruction from a user. The user is able to make corrections on the automatically recognized ROI to set an ROI suiting the preference of the user.

Also, in an embodiment of the present invention, the ROI recognition module may each include a recognition condition, and the ROI control unit may change the recognition condition of the selected ROI recognition module according to an instruction from a user. The user is able to adjust the ROI recognition condition to set an ROI suiting the preference of the user.

Further, in an embodiment of the present invention, at least one of the ROI recognition modules may detect a region of the image data containing a face and using the region as a base region to recognize the ROI. A face portion of a portrait image, for example, can be set as the ROI.

Additionally, in an embodiment of the present invention, at least one of the ROI recognition modules may detect a region of the image data in which high frequency components are concentrated and using the region as a base region to recognize the ROI. An intricate portion of a landscape image, for example, can be set as the ROI.

Also, in an embodiment of the present invention, at least one of the ROI recognition modules may detect a region of the image data in which patterns having a striking contrast are concentrated and using the region as a base region to recognize the ROI. A region of the image containing a barcode or letters can be set as the ROI.

Additionally, in an embodiment of the present invention, at least one of the ROI recognition modules may detect a region at a center portion of the image data Containing an object and using the region as a base region to recognize the ROI. A region containing an object, which is oftentimes at the center portion of the image, can be set as the ROI.

Also, in an embodiment of the present invention, at least one of the ROI recognition modules may use an AF evaluation region used in an image capturing operation of the image data as a base image to recognize the ROI. A region containing an object on which the focus is directed can be set as the ROI.

Additionally, in an embodiment of the present invention, at least one of the ROI recognition modules may use an AE evaluation region used in an image capturing operation of the image data as a base image to recognize the ROI. A region containing an object on which the exposure is directed can be set as the ROI.

Also, in an embodiment of the present invention, at least one of the ROI recognition modules may detect a region of the image data in which movement is perceived and using the region as a base region to recognize the ROI. A region containing the moving object in a captured image of a moving object can be set as the ROI.

Additionally, in an embodiment of the present invention, at least one of the ROI recognition modules may extract a region of the image data that is significantly brighter than a corresponding region of monitoring image data obtained right before an image capturing operation and using the region as a base region to recognize the ROI. A portion of a captured flash image containing the object, which is positioned dose by, can be set as the ROI.

Also, in an embodiment of the present invention, at least one of the ROI recognition modules may detect a high brightness region of the image data and using the region as a base region to recognize the ROI. A bright portion of the image containing the object can be set as the ROI.

Additionally, in an embodiment of the present invention, at least one of the ROI recognition modules may detect a high brightness region of the image data, subtracting from the region a high brightness region portion at a predetermined portion of the image data, and using the resulting region as a base region to recognize the ROI. A bright portion of the image except for upper portion of the image representing the sky can be set as the ROI.

Also, in an embodiment of the present invention, at least one of the ROI recognition modules may recognize the ROI based on a packet size of compressed data of the image data. As is described below, according to JPEG 2000, tile data are packets of respective regions called precincts, and a precinct with a large packet size (amount of codes) is likely to be an important portion of the image. The ROI can be set based on the packet size of each precinct.

In another embodiment, an electronic camera apparatus includes an ROI setting apparatus as described herein. In one embodiment, an optimum ROI can be set for a variety of captured scenes and the ROI can also be set according to the preference of the user.

In one embodiment, a program administers a computer to function as multiple ROI recognition modules and an ROI control unit of the ROI setting apparatus. Further, in another embodiment, a computer readable recording medium stores a program according to the present invention. By using such program and/or recording medium, the ROI setting apparatus of the present invention can be realized by a computer such as a personal computer or a microcomputer.

In another embodiment of the present invention, an ROI setting method includes: selecting an ROI recognition method out of multiple ROI recognition methods; recognizing an ROI of image data according to the selected ROI recognition method to obtain a recognition result; and setting ROI information based on the obtained recognition result.

In embodiments of the present invention described below, algorithms conforming to JPEG 2000 are used in the compression process of an image. Image compression algorithms according to JPEG 2000 are described in detail in *Next Generation Image Encoding Technique JPEG* 2000, Yasuyuki Nomizu, Triceps, Co. Ltd., for example. In the following, a brief description of the algorithms is given with reference to FIGS. 2 through 4.

FIG. 2 is a schematic block diagram illustrating image compression/decompression processes according to JPEG 2000. Herein, image data being subjected to the compression process (e.g., image data of each frame in a case where moving images are handled) are divided into rectangular regions called tiles that do not overlap with one another. In a DC level/color space conversion/de-conversion unit 200, a level shift operation and a color space conversion process are performed in order to raise the compression rate. The level shift operation involves subtracting half a dynamic range from an integral value such as an RGB value that has no codes. The level shift operation is not performed on an integral value having a code, and thus, if the input image data corresponds to YCrCb data, for example, the Cr and Cb components, which have attached codes, do not go through the level shift operation. The color space conversion process involves converting input image data into YCrCb data when the input image data correspond to RGB data or CMY data. It is noted that in an alternative embodiment, this DC level/color space conversion/de-conversion unit 200 may be omitted.

Then, in a two-dimensional wavelet conversion/de-conversion unit 202, a Two-dimensional wavelet conversion (discrete wavelet transform: DWT) is performed on the image data of each component of each tile that has been processed by the DC level/color space conversion/de-conversion unit 200.

Figure 3B:
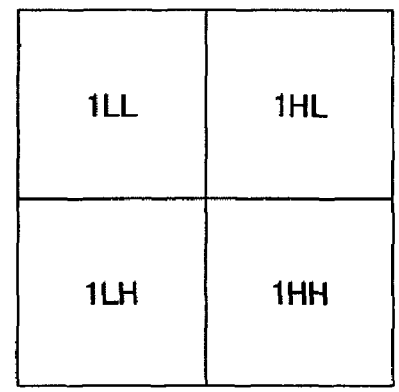
Figure 3C:
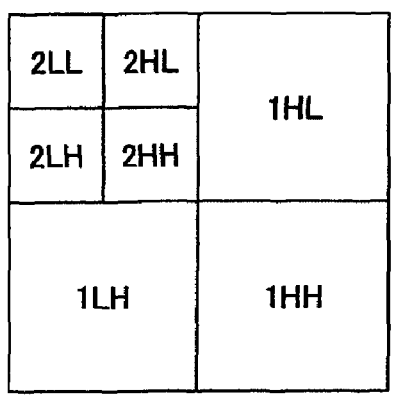
Figure 3D:
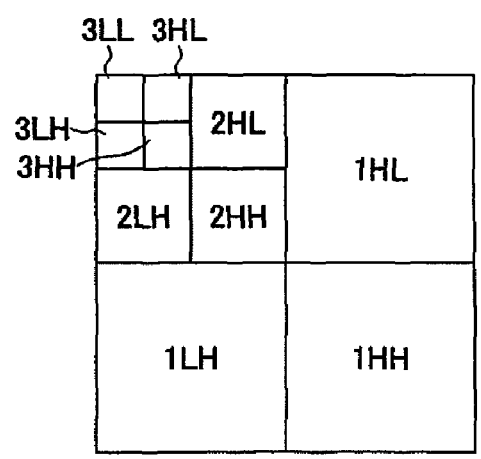

FIGS. 3A-3D are diagrams illustrating an exemplary two-dimensional wavelength conversion process in a case where the decomposition level is 3. Specifically, with the two-dimensional wavelet conversion process, a tile image shown in FIG. 3A is divided into sub bands 1LL, 1HL, 1LH, and 1HH as shown in FIG. 3B. Then, by performing a further two-dimensional wavelet conversion on the coefficients of the sub band 1LL, the sub band 1LL is divided into sub bands 2LL, 2HL, 2LH, and 2HH as shown in FIG. 3C. Then, by performing a further two-dimensional wavelet conversion on the coefficients of the sub band 2LL, the sub band 2LL is divided into sub bands 3LL, 3HL, 3LH, and 3HH, as shown in FIG. 3D.

Referring back to FIG. 2, each of the sub band coefficients obtained from a recursive division (octave division) of the low frequency components (coefficients of sub band LL) are quantized by a quantitation/de-quantization unit 204, after which the data is encoded by an entropy coding/decoding unit 206. In JPEG 2000, both reversible compression (lossless compression) and irreversible compression (lossy compression) are possible. In the case of a reversible compression, the quantization step width is 1, and quantization is not actually performed at this stage.

The entropy coding/decoding unit 206 performs entropy coding on wavelet coefficients. In the above entropy coding, a block-base bit plane coding scheme called EBCOT (Embedded Block Coding with Optimized Truncation) including block division, coefficient modeling, and binary arithmetic coding is used. The wavelet coefficients being subjected to coding are either positive or negative integers, and while a scanning operation of these coefficients is performed in a designated order, the coding is performed on the coefficients represented in absolute values one bit plane at a time from a higher bit plane to a lower bit plane.

A code sequence generated at the entropy coding/decoding unit 206 is sent to the tag processing unit 208 where the code sequence is arranged into a code stream with tag information attached thereto, after which the code stream is output.

Figure 4:
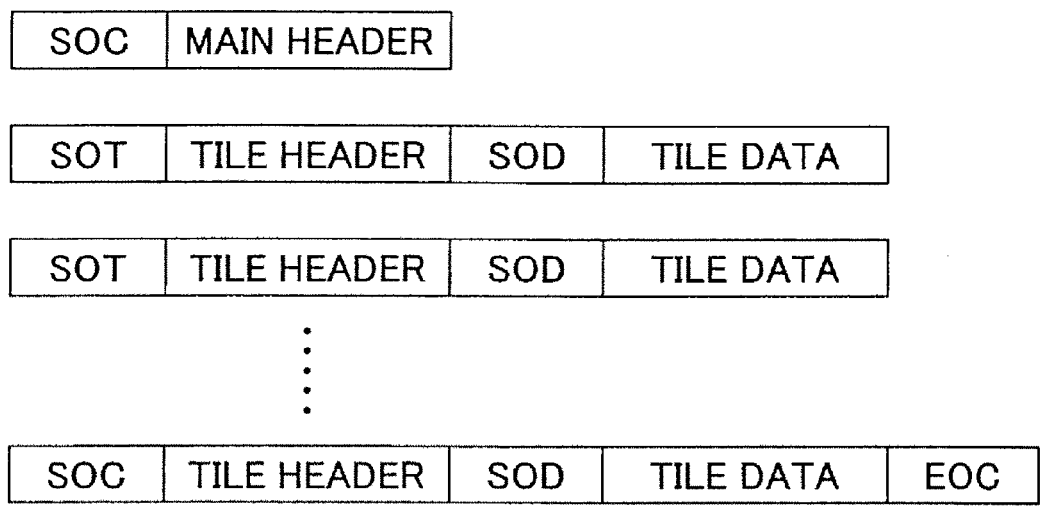
FIG. 4 is a diagram showing a configuration of compressed image data (code stream) generated according to the JPEG 2000.

FIG. 4 is a diagram illustrating a configuration of the code stream (compressed image data). As is shown in the drawing, the code stream begins with an SOC marker, which is followed by a main header describing a parameter for the coding operation or a parameter for the quantization process, for example. Then, the code stream of each tile follows. The code stream of each tile starts with an SOT marker, followed by a tile header, then an SOD marker, and then tile data. Further, an EOC marker indicating the end of the code stream is placed after the last tile data set in the code stream. Each set of tile data corresponds to a packet of the codes of the coefficients of the sub bands in each region called a precinct.

Herein, it is noted that the algorithms according to JPEG 2000 have many features other than that of realizing excellent image quality at a high compression rate (low bit rate).

One feature of the JPEG 2000 algorithms is the above-described selective region image quality improvement function (ROI function). According to the basic method of JPEG 2000 (JPEG 2000 Part 1), an ROI method of shifting the wavelet coefficient values of a selected region to a higher bit plane and shifting the wavelet coefficients of the rest of the regions to a lower bit plane before encoding the wavelet coefficients (max-shift method) is used. Alternatively, the ROI function may be realized in the quantization process by quantizing the wavelet coefficient values of the ROI using more intricate quantization steps than those for the rest of the regions. In either case, the ROI method can realize a reduction in the overall amount of codes without degrading the image quality of the ROI of the image.

Referring back to FIG. 2, the decompression process of the code stream is the reverse process of the compression process. Namely, tag information of an input code stream is read and broken down into a code sequence of the respective components of the respective tiles by use of the tag processing unit 208. Then, the resulting sequence is decoded into wavelet coefficients in the order according to the tag information by use of the entropy coding/decoding unit 206. The decoded wavelet coefficients are de-quantized by the quantization/de-quantization unit 204, after which a two-dimensional wavelet de-conversion is performed on the de-quantized data by use of the two-dimensional wavelet conversion/de-conversion unit 202 so that the image data of the respective components of the respective tiles are reproduced. Then the DC level/color space conversion/de-conversion unit 200 performs the reverse conversion of the conversion performed in the compression process on the image data of the respective components of the respective tiles, after which the image is output.

FIG. 1 is a schematic block diagram illustrating an embodiment of the present invention. An electronic camera apparatus shown in this drawing has an image capture unit 100, a storage unit 102, a display unit 104, a compression/decompression unit 106, a write/read unit 108, an ROI setting apparatus that includes an ROI control unit 120 and an ROI recognition unit 122, and an operation unit 124 for a user to input instructions relating to the ROI setting operation.

The image capture unit 100 captures an image of an object with an optical lens and outputs the captured image data like a conventional image capture unit of a digital camera. Further, the image capture unit 100 has a still image capture mode and a moving image capture mode. Also, the image capture unit 100 may have an auto-focus (AF) function, an auto-exposure (AE) function, and a flash function, for example. In the present embodiment, it is assumed that the electronic camera apparatus uses the AF scheme and the AE scheme to determine the focusing condition or the exposure condition based on a plurality of evaluation regions of an image.

The storage unit 102 temporarily stores the image data output by the image capture unit 100 or image data decompressed by the compression/decompression unit 106. The display unit 104 displays the image data stored in the storage unit 102 and other information on an LCD panel, for example, and is also used as an EVF (electronic view-finder). The compression/decompression unit 106 performs the compression process on the image data and the decompression process on the code stream using the algorithms according to JPEG 2000 as described above. The write/read unit 108 writes the code stream output from the compression/decompression unit 106 on a recording medium 110 as an image file, or reading the image file from the recording medium 110.

The ROI recognition unit 122 is arranged to automatically recognize the ROI of an image, and includes ten various ROI recognition modules (1) through (10) each conforming to an ROI recognition method differing from one another. The ROI recognition method of each of these recognition modules will be described in detail later on. The ROI control unit 120 definitively sets the ROI information based on information relating to a selection of the ROI recognition module of the ROI recognition unit 122, a control of the selected ROI recognition module, and the ROI (candidate) recognized by the ROI recognition module. The ROI control unit 120 also stores ROI recognition conditions (parameter values).

Instructions from a user relating to the ROI setting operation are input from the operation unit 124 to the ROI control unit 120. In the following, examples of the instructions input from the operation unit 124 are given.
  (a) instruction to perform an ROI setting operation involving the user
  (b) instruction, given during an ROI setting operation involving the user, that instructs the selection of a particular region in a case where a plurality of ROIs (candidates) have been automatically recognized
  (c) instruction, given during an ROI setting operation involving the user, that instructs the enlargement/reduction of the ROI (candidate) that has been automatically recognized
  (d) instruction, given during an ROI setting operation involving the user, that instructs the change of a parameter relating to the ROI recognition process
  (e) instruction to select an ROI recognition method (module)
  (f) instruction to automatically set the ROI of a still image
  (g) instruction to automatically set the ROI upon capturing a moving image Also, the image capture unit 100 supplies image capture condition information such as image capture mode information (information distinguishing between the still image capture mode and the moving image capture mode), flash information (information indicating the flash mode), AF information (information on the AF evaluation region used in the focus evaluation for the image capture operation), AE information (information on the AE evaluation region used in the optimum exposure evaluation for the image capturing operation), and scene selection information (information indicating the type of scene selected by a scene selection switch) to the ROI control unit 120.

Figure 5:
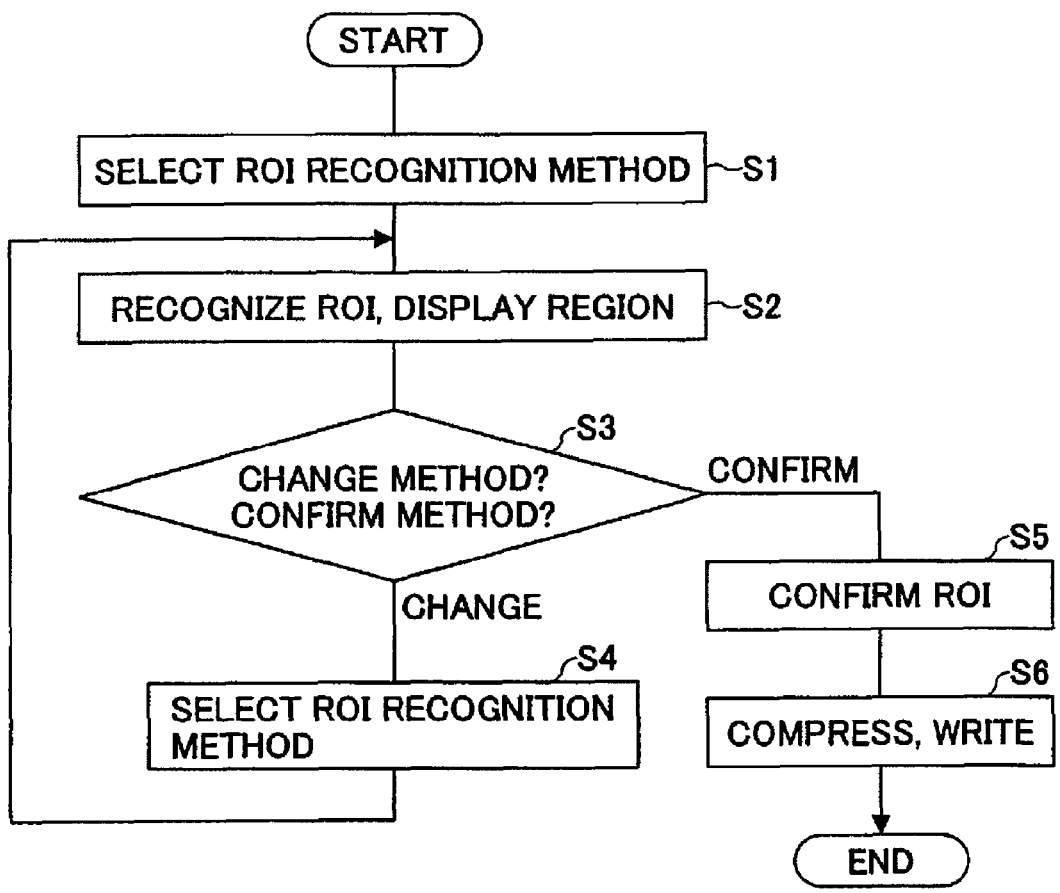
FIG. 5 is a flowchart of an ROI setting operation.

FIG. 5 is a flowchart illustrating an ROI setting operation involving the user that is performed, for example, each time a still image is captured. In this case, in the still image capture mode, the instruction (a) to perform the ROI setting operation involving the user may be given during a monitoring operation (or during display of through images) in which images captured by the image capture unit 100 (monitoring images or through images) are successively displayed on the display unit 104.

As is shown in FIG. 5, in step S1, the ROI control unit 120 selects one of the ROI recognition modules implemented in the ROI recognition unit 122. In a case where a particular scene type is selected by the scene selection switch of the image capture unit 100, an ROI recognition module for the selected scene type according to the scene selection information is selected. In a case where the scene type is not selected, a default ROI recognition module or an ROI recognition module pre-designated by the user is selected.

The image capture unit 100 performs scene monitoring until a release switch is pushed. Herein, the image capture unit 100 successively outputs data of the monitoring images, and this data is stored in the storage unit 102. Then, the monitoring images are displayed on the display unit 104. It is noted that a monitoring image is usually an image in which some of the scanning lines are left out.

When the release switch is pushed, the image capture unit 100 captures a still image. The data of the captured still image without the scanning lines being left out are stored in the storage unit 102, after which this captured image is displayed on the display unit 104. Herein, data of at least one monitoring image obtained right before the image capturing operation are also stored in the storage unit 102.

In step S2, the ROI control unit 120 administers the selected ROI recognition module to perform an ROI recognition process on this captured still image data, and also administers the display unit 104 to display the recognized ROI on the captured still image. At this point, it is possible to enlarge/reduce or select the automatically recognized ROI, or to make changes in the parameter values determining the ROI recognition condition, for example. The detailed descriptions of such operations will be described later on.

In step S3, if the user inputs an instruction to confirm the ROI via the operation unit 124, then in step S5, the ROI control unit 120 confirms the ROI information based on the current ROI, and sets this information to the compression/decompression unit 106 and the write/read unit 108. Also, the ROI control unit 120 stores the parameter values used for this ROI recognition process. Then, in step S6, the captured still image data stored in the storage unit 102 are compressed by the compression/decompression unit 106, and the resulting code stream is written on the recording medium 110 as an image file by use of the write/read unit 108. In this compression process, the ROI is compressed at a compression rate lower than that for the rest of the regions in accordance with the set ROI information. Also, the ROI information is described in the header of the image file.

Further, if the user inputs the instruction (e) to select the ROI recognition module after step S2, the ROI recognition module can be altered. In response to this instruction, the ROI control unit 120 selects an ROI recognition module other than the currently selected ROI recognition module in step S4, and administers the newly selected ROI recognition module to perform the ROI recognition process over again and display the recognized ROI on the display unit 104.

Figure 6:
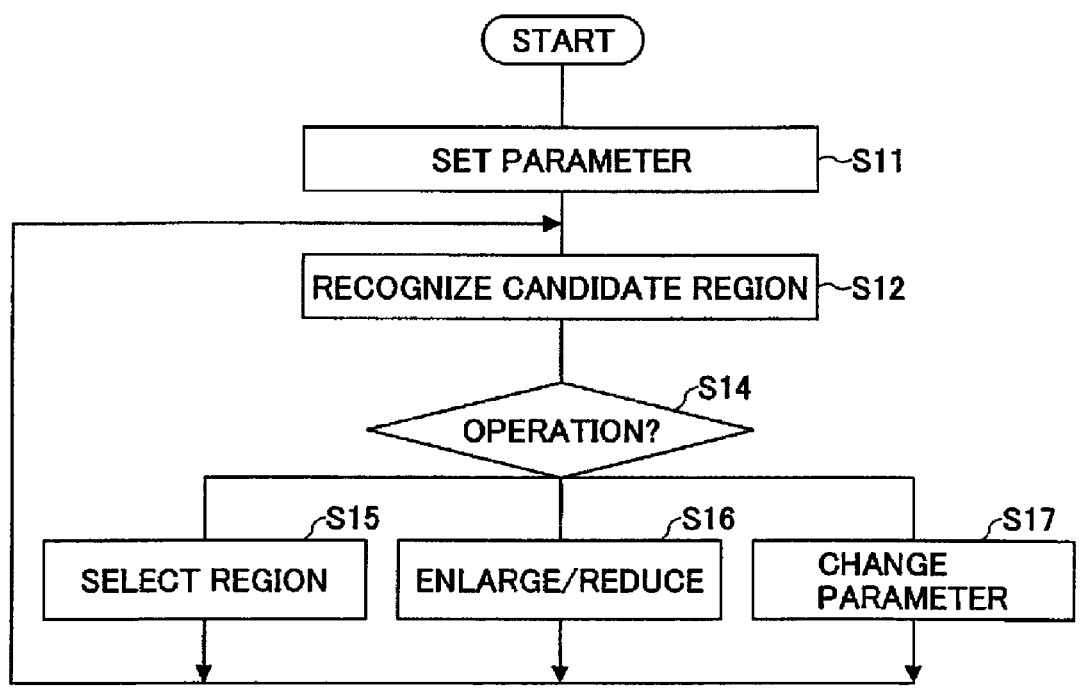
FIG. 6 is a flowchart of an operation shown in FIG. 5.

FIG. 6 is a flowchart illustrating detailed process steps for the operation of step 2.

First, in step S11, the ROI control unit 120 sets the parameter values (described below) for controlling the recognition conditions for the selected ROI recognition module (method). The parameter values may be either default values or values previously used and stored. Then, in step S12, the ROI control unit 120 administers the ROI recognition module to perform ROI recognition and also administers the display unit 104 to display the recognized ROI (still an ROI candidate at this point) on the captured image.

Thus, the user can see the displayed ROI candidate, and can then input instructions (b), (c), and/or (d) as necessary or desired. More specifically, when a plurality of ROI candidates are recognized, the user may, for example, use a cursor on the screen of the display unit 104 to specify the necessary or desired region and the unnecessary region (instruction (b)). Also, the user may use an enlargement/reduction indicator displayed on the screen of the display unit 104 to instruct the enlargement/reduction of the required region from the recognized ROI candidate, or instruct the enlargement/reduction of each individual ROI candidate using a cursor (instruction (c)). Also, the user may use a parameter value indicator displayed on the display unit 104 to instruct an increase or decrease of a parameter value controlling the ROI recognition condition (instruction (d)).

In step S14, the ROI control unit 120 determines the type of instruction input from the operation unit 124, and performs the appropriate operation according to the determined instruction.

In a case where the region selection instruction (b) is input, the process moves on to step S15 where the ROI control unit 120 invalidates the region(s) selected by the user from among the plurality of recognized ROI candidates. Thus, the user is able to validate the preferred ROI candidate when a plurality of ROI candidates are recognized. This process may be performed repeatedly, and after each time this process is performed, the display is rearranged in step S12.

In a case where the region enlargement/reduction instruction (c) is input, the process moves on to step S16 where the ROI control unit 120 enlarges or reduces the ROI candidate according to this instruction. Thus, the user is able to enlarge or reduce the automatically recognized ROI candidate as necessary or desired. This process may be performed repeatedly, and after each time this process is performed, the display is rearranged in step S12.

In a case where the parameter alteration instruction (d) is input, the process moves on to step S17 where the ROI control unit 120 changes the parameter value, and administers the ROI recognition module to perform a recognition process once more so that the newly recognized ROI candidate is displayed on the display unit 104 in step S12.

In the following, each of the ROI recognition modules implemented in the ROI recognition unit 122 and the respective parameters relating to each of the ROI recognition module will be described.

Figure 7:
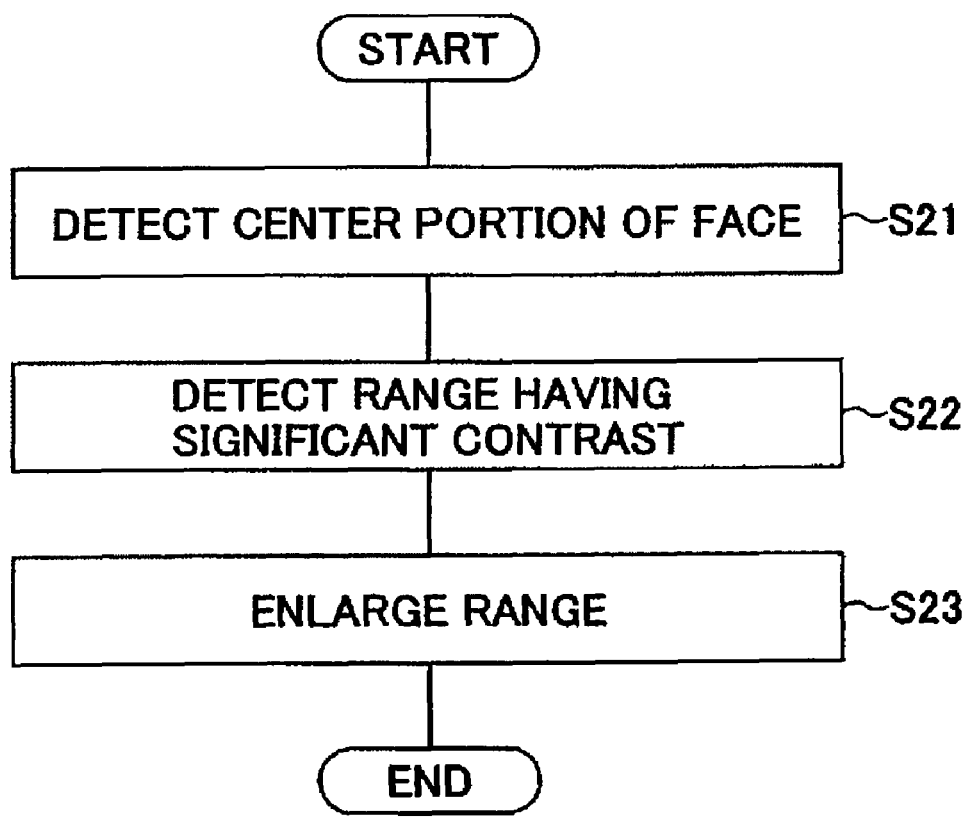
FIG. 7 is a flowchart of the operation of an ROI recognition module (1)

Referring to FIG. 7, according to ROI recognition module (1), a face portion recognition process is performed on the image data in step S21 so that the eyes, nose, mouth and other facial features of a person are particularly taken into consideration and a center region of a person's face is detected from the image. Then in step S22, a range having significant contrast and including the center region (base region) is detected, and in step S23, the detected range is slightly enlarged and this enlarged range is recognized as an ROI candidate. Herein, a significant contrast determination threshold value and/or an extent of enlargement of the range correspond to the parameter values of this ROI recognition module (1). Further, this ROI recognition module (1) is selected when a 'person' is selected as the scene type by the scene selection switch. Also, the range detected in step S22 may be used as the ROI candidate without being enlarged.

Figure 8:
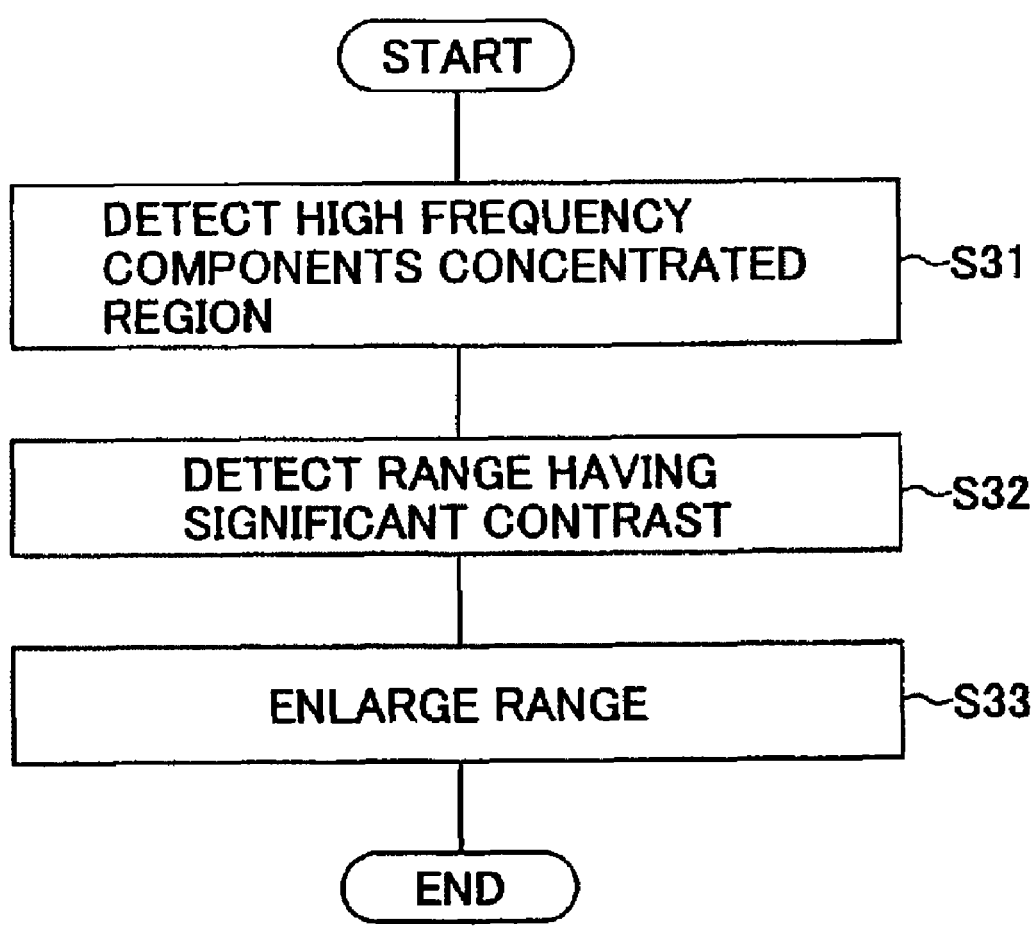
FIG. 8 is a flowchart of the operation of an alternative ROI recognition module (2)

Referring to FIG. 8, according to ROI recognition module (2), a region of the image in which high frequency components are concentrated is detected in step S31. Then in step S32, a range having significant contrast and including this region (base region) is detected, and in step S33, the detected range is slightly enlarged and this enlarged range is recognized as an ROI candidate. Herein, a high frequency component detection threshold value, the significant contrast determination threshold value, and/or the extent of enlargement of the range correspond to the parameter values of this ROI recognition module (2). Further, the range detected in step S32 may be used as the ROI candidate without being enlarged.

Figure 9:
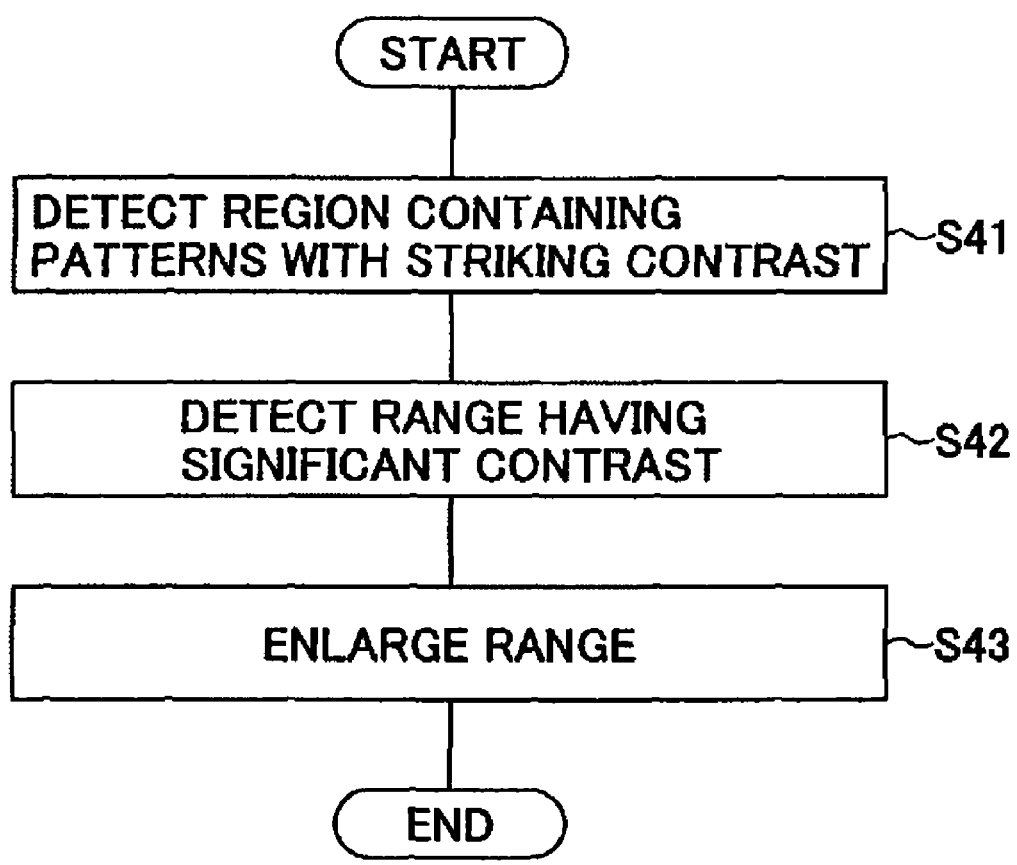
FIG. 9 is a flowchart of the operation of another alternative ROI recognition module (3)

Referring to FIG. 9, according to ROI recognition module (3), a region of the image in which patterns with striking contrast such as a bar code or letters are concentrated is detected in step S41. Then in step S42, a range having significant contrast and including this region (base region) is detected, and in step S43, the detected range is slightly enlarged and the enlarged range is recognized as an ROI candidate. Herein, a striking contrast determination threshold value, the significant contrast determination threshold value, and/or the extent of enlargement of the range correspond to the parameter values of this ROI recognition module (3). Further, the range detected in step S42 may be used as the ROI candidate without being enlarged.

Figure 10:
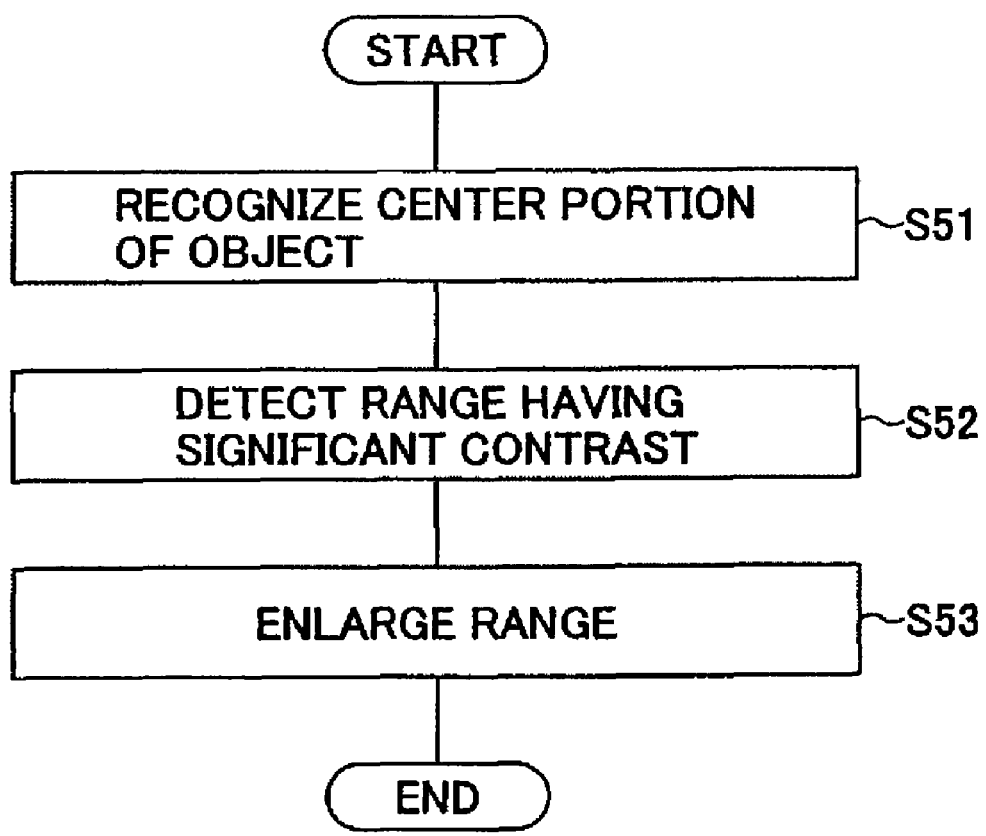
FIG. 10 is a flowchart of the operation of another alternative ROI recognition module (4)

Referring to FIG. 10, according to ROI recognition module (4), an object in a center portion of the image is recognized in step S51. Then, in step S52, a range having significant contrast and including the recognized object region (base region) is detected. Then, in step S53, the detected range is slightly enlarged and this enlarged range is recognized as an ROI candidate. Herein, the significant contrast determination threshold value and/or the extent of enlargement of the range correspond to the parameter values of this ROI recognition module (4). Further, the range detected in step S52 can be used as the ROI candidate without being enlarged.

Figure 11:
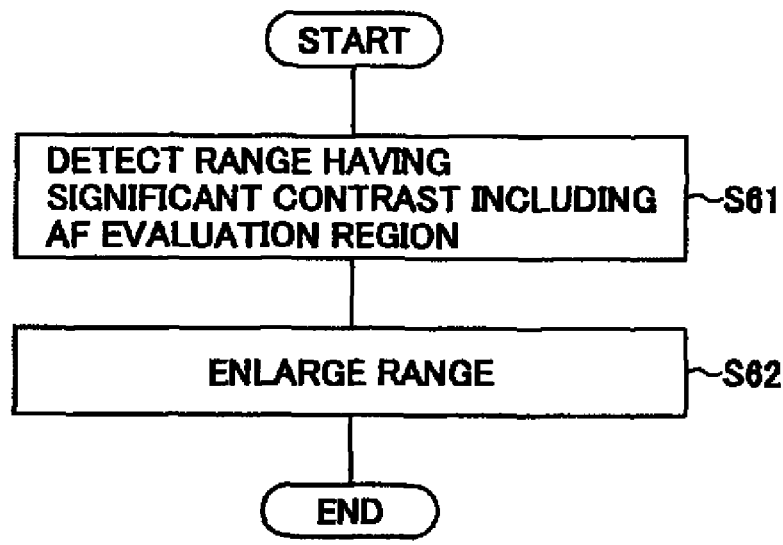
FIG. 11 is a flowchart of the operation of another alternative ROI recognition module (5)

Referring to FIG. 11, according to ROI recognition module (5), a range having significant contrast and including a final AF evaluation region used in a focus determination (provided by the image capture unit 100 as AF information) is detected in step S61. Then in step S62, the detected range is slightly enlarged and this enlarged range is recognized as an ROI candidate. Herein, the significant contrast determination threshold value and/or the extent of enlargement of the range correspond to the parameter values of this ROI recognition module (5). Further, the range detected in step S61 may be used as the ROI candidate without being enlarged. Also, in order to use the ROI recognition module (5) on an image recorded in the recording medium 110, the AF information obtained upon capturing this image may be recorded on the header of the corresponding image file.

Figure 12:
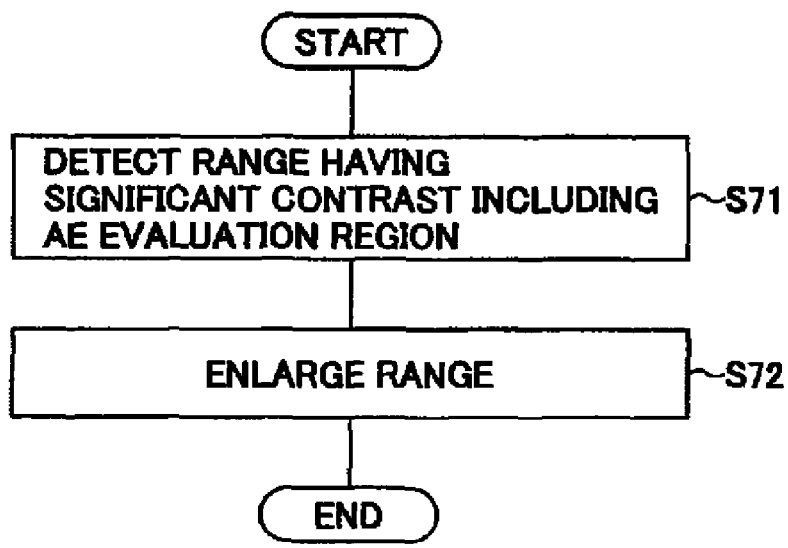
FIG. 12 is a flowchart of the operation of another alternative ROI recognition module (6)

Referring to FIG. 12, according to ROI recognition module (6), a range having significant contrast and including a final AE evaluation region (provided by the image capture unit 100 as AE information) used in an optimum exposure determination is detected in step S71. Then, in step S72, the detected range is slightly enlarged and this enlarged range is recognized as an ROI candidate. Herein, the significant contrast determination threshold value and/or the extent of enlargement of the range correspond to the parameter values of this ROI recognition module (6). Further, the range detected in step S71 may be used as the ROI candidate without being enlarged. Also, in order to use the ROI recognition module (6) on an image recorded in a recording medium 110, the AE information obtained upon capturing this image may be recorded on the header of the corresponding image file.

Figure 13:
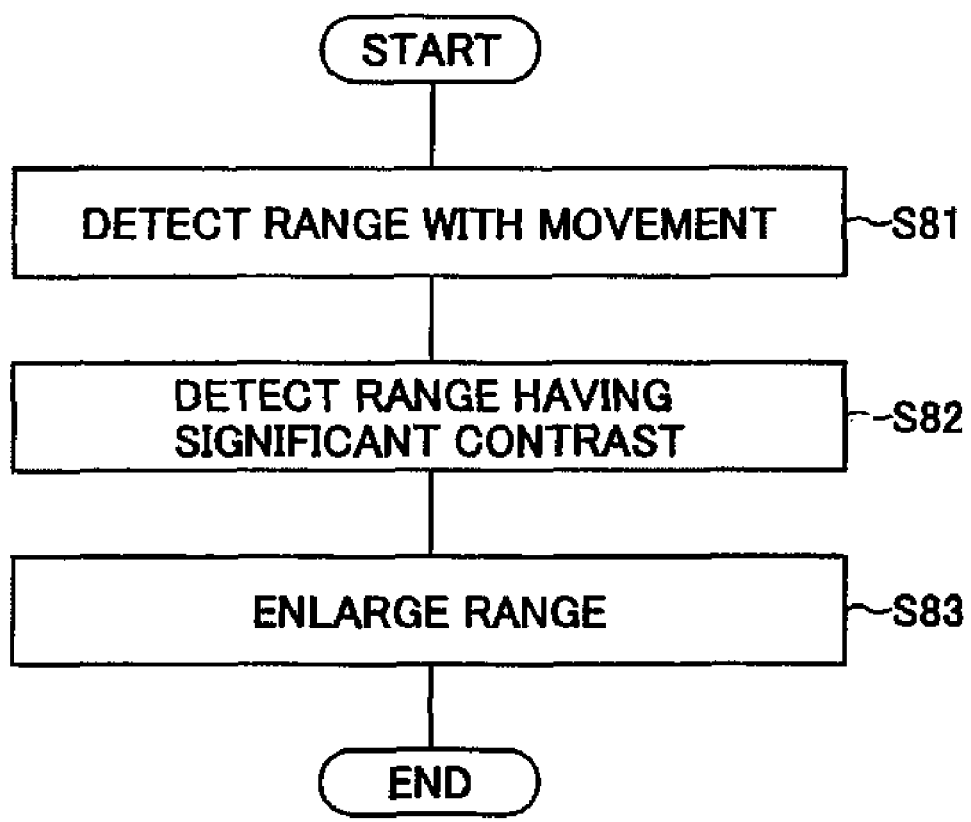
FIG. 13 is a flowchart of the operation of another alternative ROI recognition module (7)

Referring to FIG. 13, according to ROI recognition module (7), a region in which movement can be detected in a subjected image based on a comparison between the subjected image and an idle image immediately preceding the image capture operation, for example, is detected in step S81. Then in step S82, a range having significant contrast and including this region (base region) is detected. Then in step S83, the detected range is slightly enlarged and this enlarged region is recognized as an ROI candidate. Herein, a movement determination threshold value, the significant contrast determination threshold value, and/or the extent of enlargement of the range correspond to the parameter values of this ROI recognition module (7). Further, the range detected in step S82 may be used as the ROI candidate without being enlarged. This ROI recognition module is selected when a 'moving object' is selected as the scene type by the scene selection switch. Also, in order to use the ROI recognition module (7) on a still image recorded in a recording medium 110, the range in which movement occurs may be detected in the image capturing stage and this information may be recorded on the header of the corresponding image file.

Figure 14:
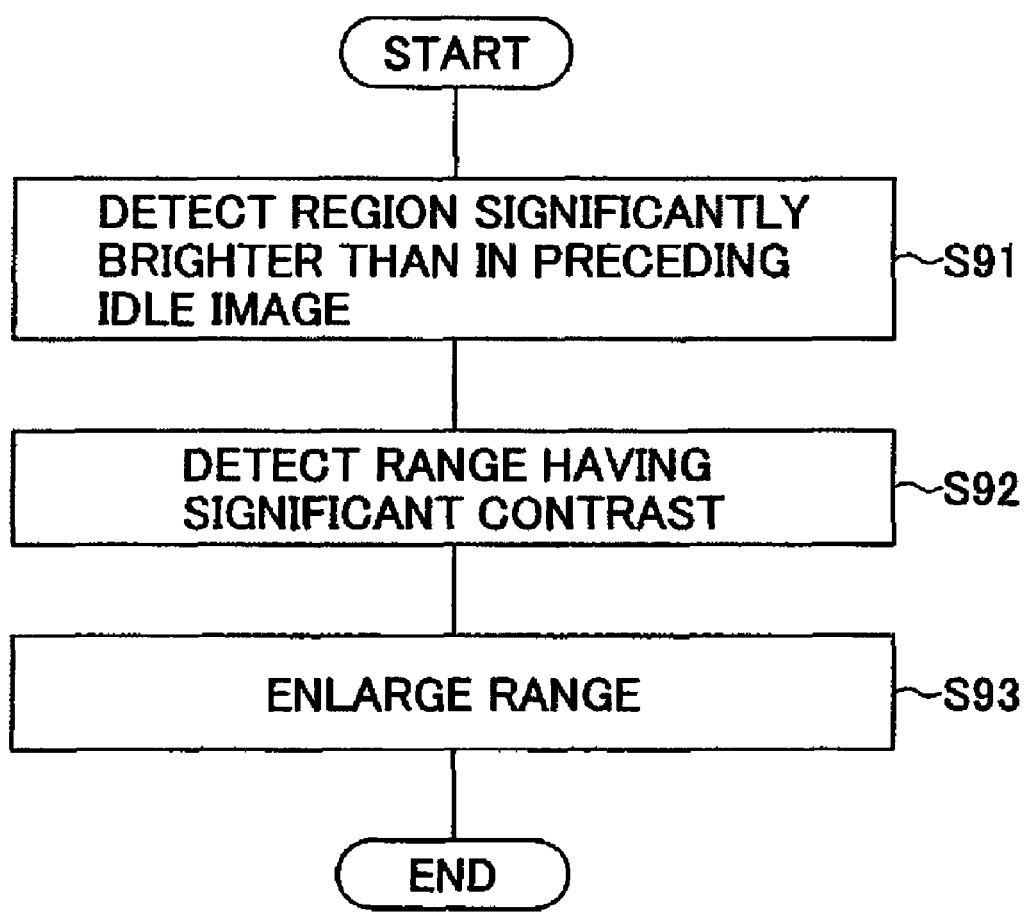
FIG. 14 is a flowchart of the operation of another alternative ROI recognition module (8)

Referring to FIG. 14, according to ROI recognition module (8), which is used in a flash image capture operation, a region of a subjected image (e.g., person or some other object) that is significantly brighter than the corresponding region in an idle image right before the flash is tune on is detected in step 91. Then in step S92, a range having significant contrast and including this region (base region) is detected, and in step S93, the detected range is slightly enlarged and the enlarged range is recognized as an ROI candidate. Herein, a threshold value for determining a region to be brighter in the subjected image than in the idle image, the significant contrast determination threshold value, and/or the extent of enlargement of the range correspond to the parameter values of this ROI recognition module (8). Further, the range detected in step S92 may be used as the ROI candidate without being enlarged.

Figure 15:
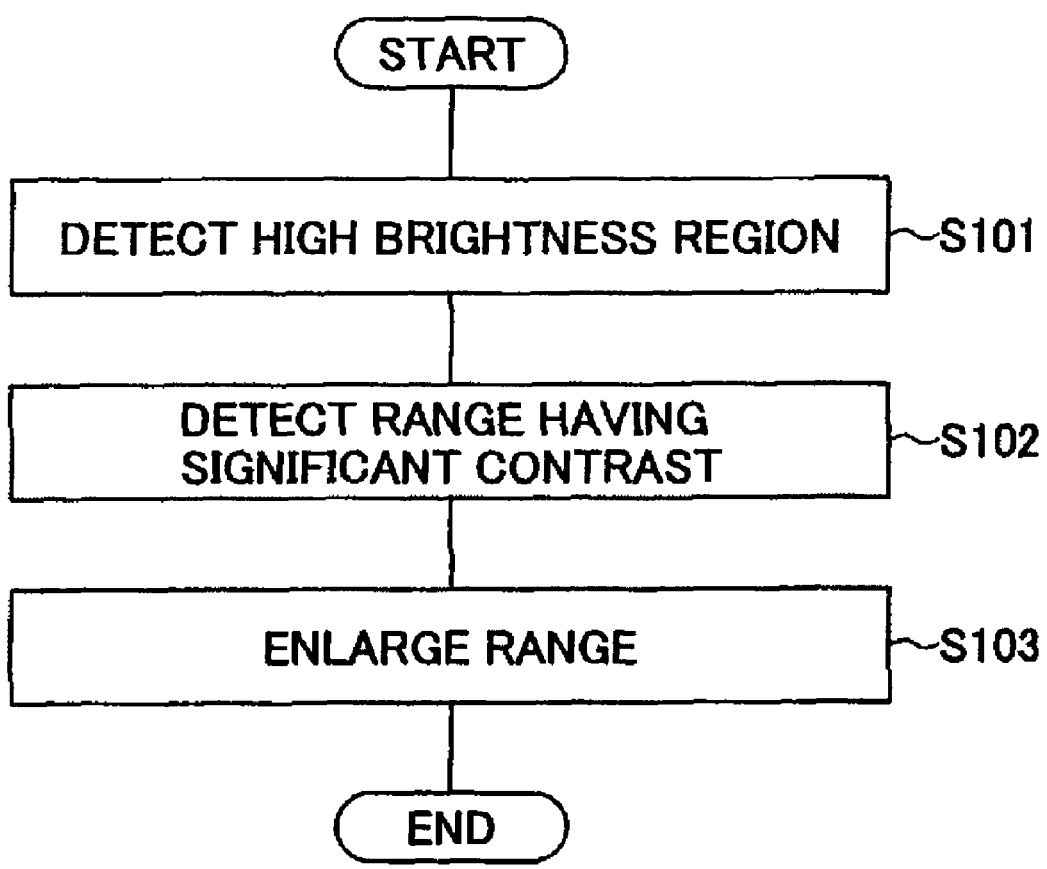
FIG. 15 is a flowchart of the operation of another alternative ROI recognition module (9)

Referring to FIG. 15, according to ROI recognition module (9), a high brightness region of the image is detected in step S101, and then in step S102, a range having significant contrast and including this region (base region) is detected. Then, in step S103, the detected range is slightly enlarged and this enlarged range is recognized as an ROI candidate. Herein, a high brightness determination threshold value, the significant contrast determination threshold value, and/or the extent of enlargement of the range correspond to the parameter values of this ROI recognition module (9). Further, the range detected in step S102 may be used as the ROI candidate without being enlarged.

ROI recognition module (10) recognizes a region in a manner identical to that of the ROI recognition module (9). However, the ROI recognition module (10) further subtracts a high brightness region portion having an area exceeding a predetenrined value and being situated in a predetermined region (e.g., an upper region) of the image (e.g., a region corresponding to the sky) from the high brightness region detected by the ROI recognition module (9), and recognizes the resulting region as the ROI candidate.

Now, referring back to FIG. 5, an operation performed upon giving the instruction (f) for automatically setting the ROI in the still image capture mode will be described.

In this case, in step S1, the ROI control unit 120 selects the ROI recognition module pre-designated by the user or the ROI recognition module corresponding to the scene type selected by the scene selection switch. In step S2, an ROI candidate is recognized by the ROI recognition module for each captured image. As for the parameter values for the ROI recognition process, if parameter values for the selected ROI recognition module are stored, the stored parameter values are used, and if there are no parameter values stored for the selected recognition module, default parameter values are set to the ROI recognition module. Then, in step S5, without waiting for the confirmation instruction from the user, the recognized ROI candidate is confirmed as the ROI, and this ROI information is set to the compression/decompression unit 106 and the write/read unit 108. Further, in this case, although a change in the ROI recognition module may be made (step S4), a selection of the region (FIG. 6, step S15), an enlargement/reduction of the region (FIG. 6, step S16), and a change in the parameter values (FIG. 6, step S17) may not be performed.

On the other hand, when the instruction (g) for automatically setting the ROI in the moving image capture mode is given, an operation identical to that performed in response to the instruction (f) for automatically setting the ROI in the still image capture mode is performed, except for the fact that the ROI is automatically set for each of the images of each of the captured frames corresponding to the captured moving image. Further, for moving image data, the image of each captured frame is independently compressed as a still image, after which the image data of all the frames are recorded on the recording medium 110 in a motion JPEG 2000 (ISO/EC FCD 15444-1) file format.

When the instruction (a) to perform ROI setting involving the user is given in an image playback mode, the user may intervene in setting the ROI of the still image or each of the frame images of the moving image that is compressed through lossless compression or low rate compression and recorded on the recording medium 110. The operation performed in this case is described below with reference to FIG. 5.

In an exemplary image playback mode, thumbnail images or lists of a plurality of images already recorded on the recording medium 110 may be displayed on the display unit 104, and the user is able to select a desired image.

When a particular image is selected, the corresponding image file is read out by the write/read unit 108 and decompressed by the compression/decompression unit 106. Then the decompressed image data is stored in the storage unit 102, and the image is displayed on the display unit 104. Then, in step S2, the ROI is recognized by use of the selected ROI recognition module. The rest of the operation is identical to the ROI setting operation of a direct continuation of the image capture operation However, the ROI recognition module (5) and/or ROI recognition module (6) may not be used unless AF information and/or AE information is described in the header of the corresponding image file. Also, in the case of replaying a still image, the ROI recognition module (7) and ROI recognition module (8) may not be used. In the case of replaying a moving image, the ROI recognition module (7) may be used since movement can be detected between consecutive frame images, but the ROI recognition module (8) may not be used.

If the ROI is already set in the replayed image, this ROI information will be described in the header of the corresponding image file. Thus, the ROI control unit 120 administers the display unit 104 to display the ROI on the image according to this ROI information.

In the above-described exemplary operations, the ROI recognition unit 122 is used. Alternatively, an ROI recognition method without using the ROI recognition unit 122 can also be realized. An example of such operation is described below with reference to FIG. 5.

When the above-described ROI recognition method without using the ROI recognition unit 122 is selected in step S1 or S4, the ROI control unit 120 administers the compression/decompression unit 106 to perform a lossless or a low rate compression process on the image data in step S2. The compression process may be performed on the wavelet coefficients at decomposition level 1, for example. Then, the size (amount of codes) of each packet in each tile data is obtained by the compression/decompression unit 106, and this is compared with the determination threshold value. Then, a region (precinct) corresponding to a packet having a size greater than the determination threshold value is recognized as the ROI. In other words, according to this operation, the ROI control unit 120 co-operates with the compression/decompression unit 106 to function as the ROI recognition module. Alternatively, the method for performing the ROI recognition may be set independently from the ROI control unit 120. In step S6, the ROI information is set to the compression/decompression unit 106 so that the compression process is performed. Also, the ROI information is set to the write/read unit 108 so that the information is described in the header of the image file that is to be written on the recording medium 110.

Further, ROI recognition involving a user is also possible in this ROI recognition method. In this case, first the recognized ROI is displayed on the display unit 104. Herein, the user is able to instruct selection of a region (corresponding to FIG. 6 step S15), enlargement/reduction of a region (corresponding to FIG. 6 step S16), and/or change of a packet size determination threshold value (corresponding to FIG. 6 step S17), for example. Then, when a completion instruction is input by the user, the ROI control unit 120 confirms the ROI and sets the ROI information (FIG. 5 step S5).

Further the compression/decompression unit 106 may alternatively be arranged to perform the compression process without taking the ROI into consideration, and the header of a packet having a size exceeding the packet size determination threshold value may be rewritten so that a precinct corresponding to this packet is arranged to be the ROI.

As is evident from the above descriptions, the ROI control unit 120, the ROI recognition unit 122, and a part or all of the compression/decompression unit 106 shown in FIG. 1 (and/or their functions and/or processes) may also be realized by programs implemented in a computer such as a personal computer or a microcomputer. Such programs and various recording (storage) mediums on which the programs are recorded are also included in the scope of the present invention. Also, the ROI setting apparatus and method according to the present invention is not limited to implementation in an electronic camera apparatus such as a digital camera and its method; rather, the present invention may be applied to various other types of image processing apparatuses that can record an image through image compression.

According to the present invention, an image processing apparatus such as an electronic camera apparatus is able to reduce limitations in the framing of an image while also reducing the trouble arising from a completely manual operation. Further, the present invention may be adapted for various scenes and user preferences, and is able to realize a practical ROI setting function that is applicable to various operations such as a successive capturing of still images or a capturing of a moving image.

The present application is based on and claims the benefit of the earlier filing date of Japanese priority application No. 2002-232475 filed on Aug. 9, 2002, the entire contents of which are hereby incorporated by reference.

What is claimed is:

1. An electronic camera apparatus comprising:
    an image capturing unit to capture a first image of an object and outputs image data;
    an ROI recognition unit to recognize a region of interest (ROI) of the image data using a plurality of different ROI recognition methods;
    an ROI control unit to select one ROI recognition method from the different ROI recognition methods according to a function related to image capture of the object or a user designation and set ROI information based on a recognition result obtained by the selected ROI recognition method; and
    a compression unit to perform a compression process on the image data according to the ROI information set by the ROI control unit;
    wherein the ROI recognition unit uses the selected ROI recognition method to recognize the ROI based on a movement determination threshold, a significant contrast determination threshold, and a range enlargement extent specified by a user of the electronic camera apparatus by detecting a region of the image data in which there is movement based on a comparison between the image data and image data from a second image immediately preceding capture of the first image, detecting a range of the image data of the first image that has a significant contrast and includes the detected region in which there is movement, enlarging the detected range, and using the enlarged range as a base region.

2. The electronic camera apparatus as claimed in claim 1, wherein
    the compression unit is operable to compress a portion of the image data corresponding to the ROI at a lower compression rate compared to a compression rate used for other portions of the image data based on the ROI information.

3. The electronic camera apparatus as claimed in claim 1, wherein
    the function related to image capture of the object corresponds to one of image capture mode, auto-focus, or strobing.

4. The electronic camera apparatus as claimed in claim 1, wherein the ROI control unit is operable to perform an enlarging process or a reducing process on the region recognized by the ROI recognition unit based on a user instruction.

5. A method comprising:
    capturing image data of an object with an electronic camera;
    recognizing a region of interest (ROI) of the image data using a plurality of different ROI recognition methods;
    selecting one ROI recognition method from the different ROI recognition methods according to a function related to image capture of the object or a user designation and set ROI information based on a recognition result obtained by the selected ROI recognition method; and
    performing a compression process on the image data according to the ROI information set by the ROI control unit,
    wherein the ROI recognition unit uses the selected ROI recognition method to recognize the ROI based on a movement determination threshold, a significant contrast determination threshold, and a range enlargement extent specified by a user of the electronic camera apparatus by detecting a region of the image data in which there is movement based on a comparison between the image data and image data from a second image immediately preceding capture of the first image, detecting a range of the image data of the first image that has a significant contrast and includes the detected region in which there is movement, enlarging the detected range, and using the enlarged range as a base region.

6. A non-transitory computer readable storage medium including instructions that, when executed by a processor, cause the processor to perform a method comprising:

capturing image data of an object with an electronic camera;

recognizing a region of interest (ROI) of the image data using a plurality of different ROI recognition methods;

selecting one ROI recognition method from the different ROI recognition methods according to a function related to image capture of the object or a user designation and set ROI information based on a recognition result obtained by the selected ROI recognition method; and performing a compression process on the image data according to the ROI information set by the ROI control unit, wherein the ROI recognition unit uses the selected ROI recognition method to recognize the ROI based on a movement determination threshold, a significant contrast determination threshold, and a range enlargement extent specified by a user of the electronic camera apparatus by detecting a region of the image data in which there is movement based on a comparison between the image data and image data from a second image immediately preceding capture of the first image, detecting a range of the image data of the first image that has a significant contrast and includes the detected region in which there is movement, enlarging the detected range, and using the enlarged range as a base region.

* * * * *